(12) United States Patent
Maguire et al.

(10) Patent No.: US 7,651,441 B2
(45) Date of Patent: Jan. 26, 2010

(54) ENGINE CONTROL FOR DISPLACEMENT ON DEMAND

(75) Inventors: Joel M. Maguire, Northville, MI (US); Joseph R. Dulzo, Novi, MI (US); Thomas E. Bolander, Flint, MI (US); William C. Albertson, Clinton Township, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 487 days.

(21) Appl. No.: 11/689,837

(22) Filed: Mar. 22, 2007

(65) Prior Publication Data

US 2008/0234106 A1 Sep. 25, 2008

(51) Int. Cl.
*B60W 10/04* (2006.01)

(52) U.S. Cl. .................................................. 477/181
(58) Field of Classification Search ............... None
See application file for complete search history.

(56) References Cited

U.S. PATENT DOCUMENTS

| | | | | |
|---|---|---|---|---|
| 5,307,269 A | * | 4/1994 | Kohno | 701/68 |
| 5,593,364 A | * | 1/1997 | Ishii et al. | 477/98 |
| 6,468,182 B1 | * | 10/2002 | Brandt et al. | 477/98 |
| 7,247,123 B2 | * | 7/2007 | Ohtake et al. | 477/98 |

* cited by examiner

*Primary Examiner*—Dirk Wright

(57) ABSTRACT

An engine control system for controlling a displacement on demand engine having a plurality of cylinders includes a torque converter with a torque converter clutch. A control module determines a slip speed of said torque converter clutch, estimates a temperature state of said torque converter clutch based on said slip speed, and selectively activates at least one of said cylinders based on said temperature state.

20 Claims, 5 Drawing Sheets

ENGINE CONTROL FOR DISPLACEMENT ON DEMAND

FIELD OF THE INVENTION

The present invention relates to internal combustion engines, and more particularly to engine control systems that control engine operation in a displacement on demand engine.

BACKGROUND OF THE INVENTION

Some internal combustion engines include engine control systems that deactivate cylinders under low load situations. For example, an eight cylinder engine can be operated using four cylinders to improve fuel economy by reducing pumping losses. This process is generally referred to as displacement on demand or DOD. Operation using all of the engine cylinders is referred to as an activated mode. A deactivated mode refers to operation using less than all of the cylinders of the engine (one or more cylinders not active).

In the deactivated mode, there are fewer cylinders operating. As a result, there is less drive torque available to drive the vehicle driveline and accessories (e.g., alternator, coolant pump, A/C compressor). Engine efficiency is increased as a result of decreased fuel consumption (i.e., no fuel supplied to the deactivated cylinders) and decreased engine pumping. Because the deactivated cylinders do not take in and compress fresh intake air, pumping losses are reduced.

Deactivated mode operation may be restricted to avoid the noise, vibration, and harshness (NVH) resulting when the engine speed matches the torque converter turbine speed. As a result, overall engine efficiency is decreased to avoid NVH. The engine speed is generally more likely to match the torque converter turbine speed at lower engine speeds than at higher engine speeds. Traditionally, deactivated mode is more restricted at lower engine speeds. Increasing the slip speed of the torque converter clutch to avoid NVH may result in high torque converter clutch temperatures and damage to the friction surfaces of the torque converter clutch.

SUMMARY OF THE INVENTION

Accordingly, the present invention provides an engine control system for controlling a displacement on demand engine having a plurality of cylinders. The engine control system comprises a torque converter with a torque convert clutch and a control module. The control module determines slip speed of the torque converter clutch and estimates a temperature state of the torque converter clutch based on the slip speed. The control module selectively activates at least one of the cylinders based on the temperature state.

In one feature, a sump temperature sensor generates a sump temperature signal based on a temperature of a sump for retaining a supply of fluid for the torque converter. The control module estimates the temperature state based on the sump temperature.

In other features, the control module determines a cumulative damage of the torque converter clutch based on at least one previous temperature state of the torque converter clutch and selectively activates at least one of the cylinders based on the cumulative damage.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
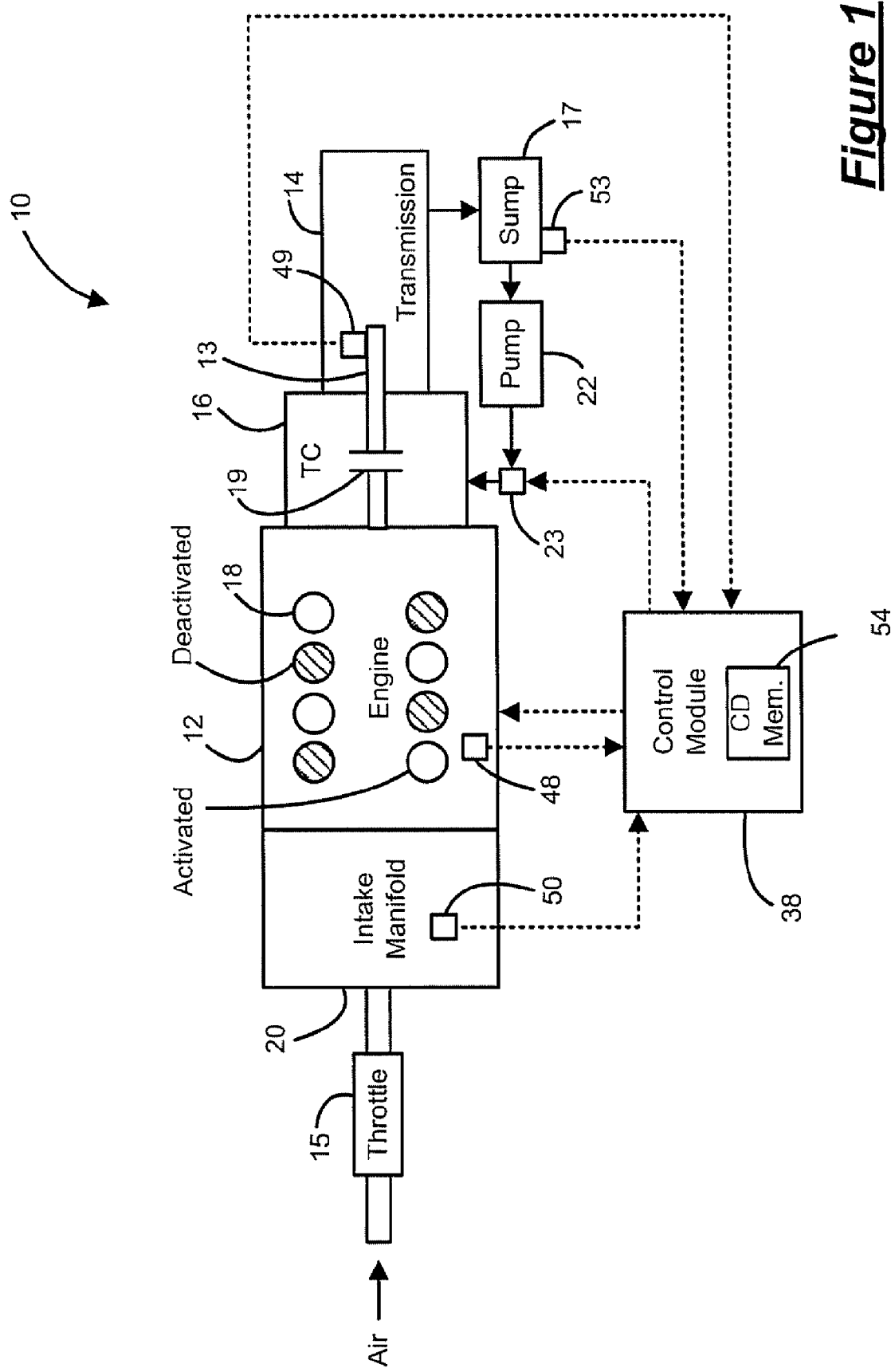
FIG. 1 is a functional block diagram illustrating a vehicle powertrain including a displacement on demand (DOD) engine that drives an automatic transmission according to the present invention.

The following description of the preferred embodiment is merely exemplary in nature and is in no way intended to limit the invention, its application, or uses. For purposes of clarity, the same reference numbers will be used in the drawings to identify similar elements. As used herein, activated refers to operation using all of the engine cylinders. Deactivated refers to operation using less than all of the cylinders of the engine (one or more cylinders not active). As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a vehicle 10 includes an engine 12 that drives a transmission input shaft 13 of a transmission 14 through a torque converter 16. The engine 12 includes N cylinders 18. One or more of the cylinders 18 are selectively deactivated during engine operation. As can be appreciated, the engine 12 may include additional or fewer cylinders 18. Although FIG. 1 depicts eight cylinders (N=8), engines having 4, 5, 6, 8, 10, 12 and 16 cylinders are contemplated. Air flows into the engine 12 through a throttle 15 and an intake manifold 20 and is combusted with fuel in the cylinders 18.

The torque converter 16 is a fluid coupling that enables the engine 12 to rotate almost independently of the transmission input shaft 13. When the engine 12 is turning slowly or idling, the amount of drive torque passed through the torque converter 16 to the transmission input shaft 13 is relatively small. As engine speed increases, more fluid is pumped through the torque converter, transferring more drive torque to the transmission input shaft 13. A reservoir or sump 17 retains a supply of the fluid. A cooling system (not shown) may cool the fluid.

The torque converter 16 includes a torque converter clutch (TCC) 19 that is operable in a locked and unlocked state. In the unlocked state, torque converter slip occurs within the torque converter 16. In the locked state, the TCC 19 provides a direct drive coupling between the engine 12 and the transmission input shaft 13. The TCC 19 can also be regulated between the locked and unlocked modes to provide a varying degree of slip. Slip of the TCC 19 can be controlled to isolate noise, vibration and harshness (NVH) under certain driving conditions, as discussed in further detail below.

A pump 22 is driven by the engine 12 and pressurizes hydraulic fluid that is used to regulate engagement of the TCC 19. More specifically, a solenoid 23 regulates flow of pressurized fluid to the TCC 19. The TCC 19 is in the unlocked mode when a maximum amount of pressurized fluid is provided thereto and the TCC 19 is in the locked mode when a minimum amount of pressurized fluid is provided thereto. The amount of pressurized fluid can be regulated between the minimum and the maximum amounts to regulate slip of the TCC 19. Fluid flow in FIG. 1 is shown by solid arrowed lines.

A control module 38 communicates with various sensors and regulates vehicle operation. An engine speed sensor 48 generates an engine rotational speed signal (ERPM) based on engine speed. A transmission input shaft speed sensor 49 generates a transmission input shaft rotational speed signal (TIRPM) based on transmission input shaft speed. An intake manifold absolute pressure sensor 50 generates an intake manifold absolute pressure signal (MAP) based on the air pressure within the intake manifold 20. A sump temperature sensor 53 generates a sump temperature signal ($T_{Sump}$) based on a temperature of the fluid in the Sump 17. The control module 38 regulates the TCC slip speed by controlling a duty cycle of the solenoid 23, which in turn controls the flow of fluid to the TCC 19.

The control module 38 selectively activates the cylinders 18 by deactivating and/or reactivating the cylinders 18. When light engine load occurs, the control module 38 transitions the engine 12 to the deactivated mode. In an exemplary embodiment, N/2 cylinders 18 are deactivated, although one or more cylinders may be deactivated. Upon deactivation of the selected cylinders 18, the control module 38 regulates the power output of the remaining or activated cylinders 18. The inlet and exhaust ports (not shown) of the deactivated cylinders 18 are closed to reduce pumping losses.

The engine load is determined based on MAP, cylinder mode, and ERPM. More particularly, engine load is based on manifold vacuum, which is the difference between MAP and the atmospheric pressure. For purposes of discussion, MAP will generally be used as an indicator of engine load. When MAP is below a threshold level ($MAP_{Thresh}$) for a given ERPM, the engine load is deemed light and the engine 12 is operated in the deactivated mode. When MAP is above the threshold level for the given ERPM, the engine load is deemed heavy and the engine 12 is operated in the activated mode. An exemplary threshold level is 95 kPa.

The control module 38 regulates TCC slip to isolate NVH while operating in the deactivated mode. More specifically, the control module 38 increases TCC slip while the engine is operating in deactivated mode. An exemplary torque converter slip control for displacement on demand is described in commonly assigned U.S. Pat. No. 6,843,752, issued on Jan. 18, 2005, the disclosure of which is expressly incorporated herein by reference.

The control module 38 enables the engine 12 to remain in the deactivated mode for an extended period of time by monitoring a temperature state of the TCC ($T_{TCC}$). The temperature state may be a temperature or thermal energy. The control module 38 uses a real-time thermal model of the TCC 19 to monitor $T_{TCC}$ and collective damage to the TCC 19 and determine whether to switch to the activated mode, with a lower TCC slip speed. An exemplary thermal model is described in commonly assigned U.S. patent application Ser. No. 10/650,208, filed on Aug. 28, 2003, the disclosure of which is expressly incorporated herein by reference.

The control module 38 determines both a TCC torque and a TCC slip speed. TCC torque is based on the flow of pressurized fluid to the TCC 19 as regulated by the solenoid 23. Alternatively, it is anticipated that a TCC torque sensor (not shown) may generate a TCC torque signal. The TCC torque sensor may include a deflection sensor or strain sensor. The TCC slip speed is calculated as the difference between ERPM and TIRPM.

The real-time thermal model estimates $T_{TCC}$ based on a heat rate ($H_R$) of the TCC 19. $H_R$ is based on TCC torque and TCC slip speed. The real-time thermal model estimates the accumulation and dissipation of heat over time. An exemplary thermal model is provided according to the following equations:

$$T_{TCC\,deriv} = \left(\frac{1}{M_{TCC}}\right)(H_R - K_{diss}(T_{TCC} - T_{sump}))$$

$$T_{TCC} = T_{TCC} + (\Delta t \cdot T_{TCC\,deriv})$$

where:
$H_R$=heat rate, based on TCC torque and TCC slip speed;
$T_{sump}$=sump temperature;
$\Delta t$=loop time of the thermal model;
$M_{TCC}$=approximate thermal inertia of the TCC (J/° C.);
$K_{diss}$=heat rejection rate of TCC and cooling system (W/° C.);

The thermal model functions as a low-pass filter that tracks the value $$\frac{H_R}{K_{diss}} + T_{sump}$$

with a time constant equal to $$\frac{M_{TCC}}{K_{diss}}.$$

Any similar low-pass filter function can be implemented to effectively perform as a thermal model.

Increased TCC slip speed may result in an increased temperature state of the TCC. The control module 38 exits the deactivated mode and decreases TCC slip speed when $T_{TCC}$ is greater than a predetermined temperature state threshold ($T_{Max}$). In addition, the control module 38 may not enter the deactivated mode when $T_{TCC}$ is greater than the predetermined temperature state threshold.

The control module 38 is configured with a memory 54 for storing cumulative damage data. High temperatures reduce the effective life of the friction surfaces of the TCC. When $T_{TCC}$ is greater than a predetermined damage temperature threshold, the control module 38 monitors cumulative damage to the friction surfaces of the TCC. More specifically, the control module 38 determines the number of TCC revolutions that occur while $T_{TCC}$ is greater than the damage temperature threshold.

The cumulative number of TCC revolutions over the life of the friction surfaces of the TCC is stored in the memory 54 and represents cumulative damage (CD) to the TCC friction surfaces. At the beginning of the effective life of the friction surfaces, the memory 54 is initialized to reflect no CD. When TCC revolutions occur during high temperatures, the control module 38 writes to the memory to reflect the increased CD. The memory may store a counter representing the total number of TCC revolutions during high temperature states over the life of the friction surfaces.

The control module 38 exits the deactivated mode and decreases TCC slip speed when CD is greater than a predetermined damage threshold ($CD_{Max}$). In addition, the control module 38 may not enter the deactivated mode when CD is greater than $CD_{Max}$.

Figure 2:
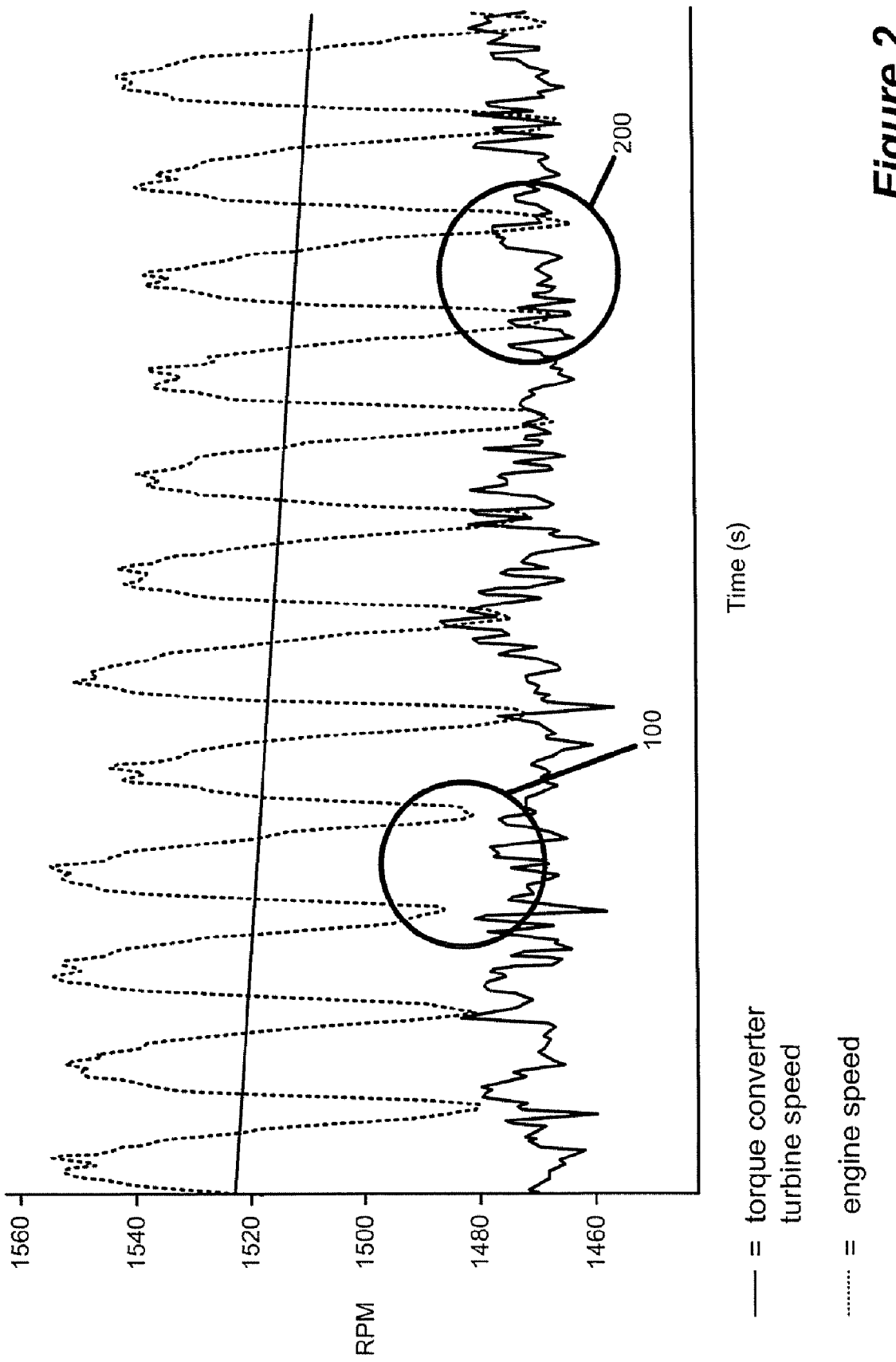
FIG. 2 is a graph illustrating an exemplary engine speed curve and an exemplary turbine speed curve.

Referring now to FIG. 2, a graph illustrates an exemplary engine speed curve and an exemplary torque converter turbine speed curve. Under certain operating conditions, TCC slip (e.g., approximately 40 RPM of slip) is sufficient to isolate NVH and avoid crashing. Such an instance is highlighted in area 100. The term crashing refers to instances where the engine speed and the turbine speed are equal, as highlighted in area 200. Crashing can result in undesirable disturbances or NVH that can be felt by vehicle passengers. Traditionally, the TCC slip speed is limited to prevent the TCC 19 from experiencing extreme temperature excursions and damage to the TCC 19. The engine control system of the present invention enables the TCC slip to be regulated based on the thermal model to provide adequate isolation and to maintain engine operation in the deactivated mode.

Figure 3:
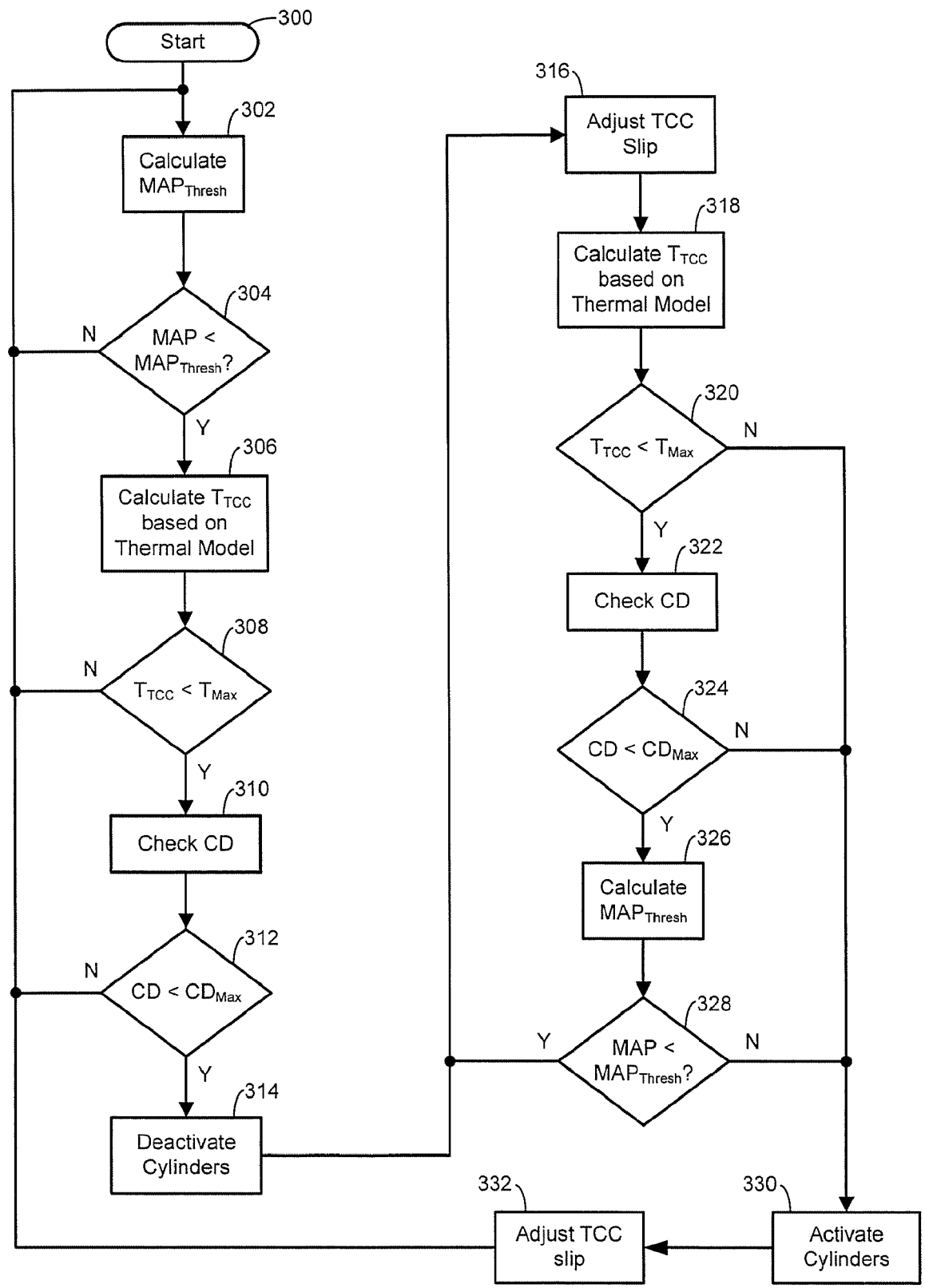
FIG. 3 is a flowchart illustrating steps performed by an engine control system according to the present invention.

Referring now to FIG. 3, a flowchart illustrates exemplary steps executed by the engine control of the present invention. Control begins with step 300 while the engine is operated in activated mode. In step 302, control calculates $MAP_{Thresh}$ based on ERPM and the active cylinder mode. In step 304, when MAP is less than $MAP_{Thresh}$ engine load is deemed light and control proceeds to step 306. When MAP is not less than $MAP_{Thresh}$, engine load is deemed heavy and control loops back to step 302.

In step 306, control calculates $T_{TCC}$ based on the thermal model as described above. In step 308, when $T_{TCC}$ is less than $T_{Max}$, control proceeds to step 310. When $T_{TCC}$ is not less than $T_{Max}$, control loops back to step 302.

In step 310, control checks the cumulative damage (CD) stored in memory 54. In step 312, when CD is less than $CD_{Max}$ control proceeds to step 314. When CD is not less than $CD_{Max}$ control loops back to step 302.

In step 314, cylinders are deactivated. In step 316, control adjusts the TCC slip speed. The TCC slip speed may be increased to avoid NVH and maintain drivability. On subsequent iterations, TCC slip speed may be adjusted to the minimum TCC slip speed necessary to avoid NVH and maintain drivability.

In step 318, control calculates $T_{TCC}$ based on the thermal model. In step 320, when $T_{TCC}$ is less than $T_{Max}$ control proceeds to step 322 and checks CD. When $T_{TCC}$ is not less than $T_{Max}$ control proceeds to step 330. When in step 324 CD is less than $CD_{Max}$ control proceeds to step 326. When CD is not less than $CD_{Max}$ control proceeds to step 330. In step 326, control calculates $MAP_{Thresh}$ based on ERPM and the deactivated cylinder mode. When in step 328 MAP is less than $MAP_{Thresh}$, control loops back to step 316 and adjusts TCC slip as necessary to avoid NVH and maintain drivability.

When MAP is not less than $MAP_{Thresh}$ control proceeds to step 330. In step 330, control activates the cylinders and proceeds to step 332. In step 332, control adjusts TCC slip speed. In step 332, TCC slip speed is generally decreased to a lower TCC slip speed, which results in a lower TCC temperature state. Control then proceeds to step 302.

Figure 4:
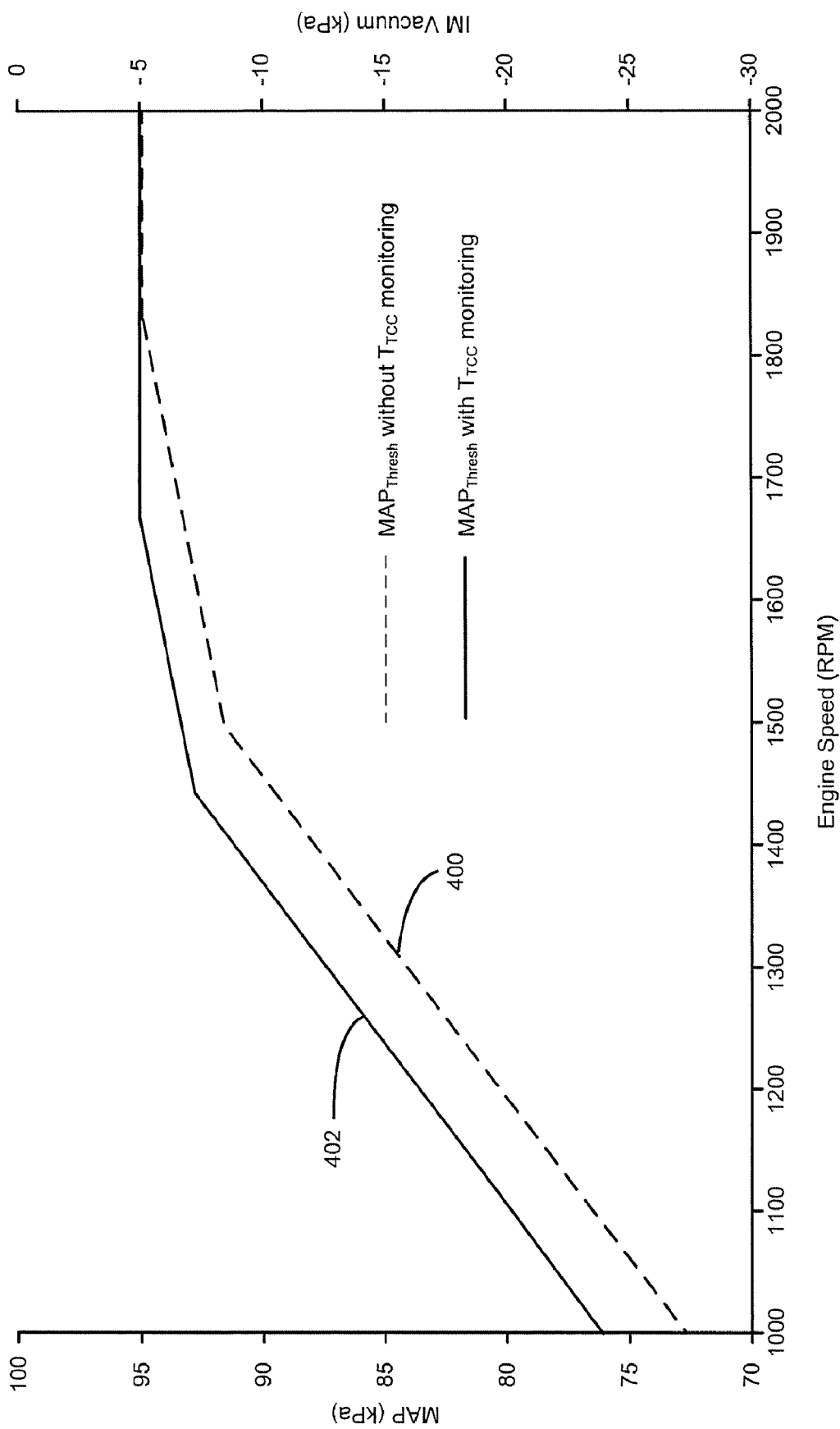
FIG. 4 is a graph illustrating intake manifold pressure threshold based on engine speed for both a traditional engine control system and an exemplary engine control system according to the present invention.

Referring now to FIG. 4, a graph illustrates $MAP_{Thresh}$ for deactivated mode and ERPM's ranging from 1000 to 2000, and for a barometric pressure of 100 kPa. To maintain drivability, and reduce NVH and TCC damage, $MAP_{Thresh}$ decreases at lower engine speeds. Line 400 represents $MAP_{Thresh}$ in a traditional engine control system that does not monitor $T_{TCC}$. Line 402 represents $MAP_{Thresh}$ in an exemplary engine control system according to the present invention that does monitor $T_{TCC}$. As can be appreciated, the exemplary engine control system allows for a higher $MAP_{Thresh}$ at a given ERPM by monitoring $T_{TCC}$.

Figure 5:
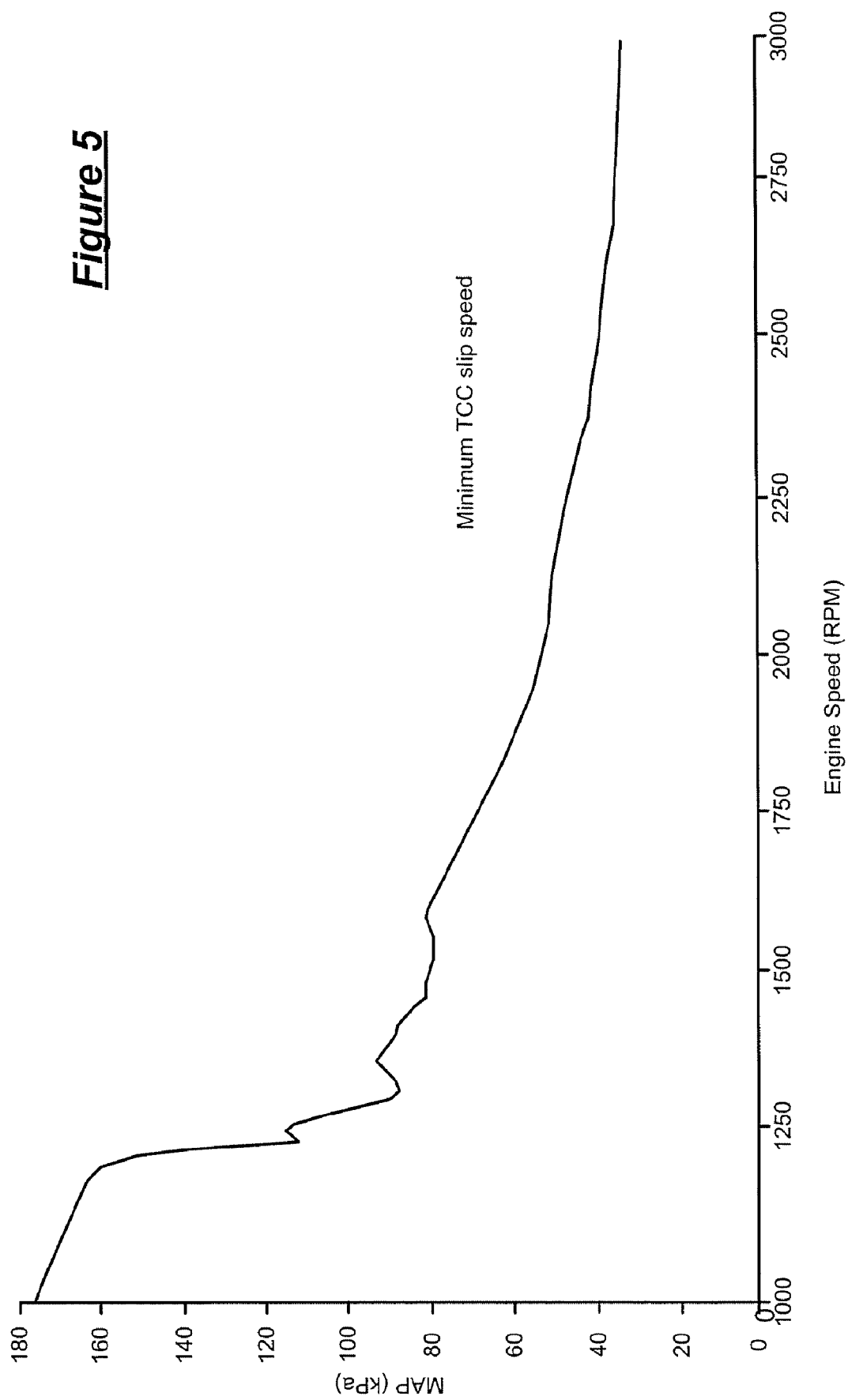
FIG. 5 is a graph illustrating minimum TCC slip speed based on engine speed during deactivated mode operation.

Referring now to FIG. 5, a graph illustrates the minimum TCC slip speed during deactivated mode operation. To maintain drivability and reduce NVH, the minimum TCC slip speed increases as engine speed decreases. Higher torque converter slip speeds result in higher torque converter temperature states. For lower engine speeds, the engine control system of the present invention operates the torque converter at the minimum TCC slip speed shown in FIG. 5, or higher, until the engine control system switches to activated mode operation.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An engine control system for controlling a displacement on demand engine having a plurality of cylinders, comprising:
    a torque converter with a torque converter clutch; and
    a control module that determines a slip speed of said torque converter clutch and estimates a temperature state of said torque converter clutch based on said slip speed;
    wherein said control module selectively activates at least one of said cylinders based on said temperature state.

2. The engine control system of claim 1 wherein said control module determines a torque of said torque converter clutch and estimates said temperature state based on said torque.

3. The engine control system of claim 2 wherein said control module regulates a flow of fluid to said torque converter clutch and determines said torque based on said flow of fluid.

4. The engine control system of claim 1 wherein said control module estimates said temperature state based on a predetermined thermal inertia of said torque converter clutch.

5. The engine control system of claim 1 wherein said control module estimates said temperature state based on a predetermined heat rejection rate of said torque converter clutch.

6. The engine control system of claim 1 further comprising:
    a sump for retaining a supply of fluid for said torque converter; and
    a sump temperature sensor that generates a sump temperature signal based on a temperature of said sump;
    wherein said control module estimates said temperature state based on said sump temperature signal.

7. The engine control system of claim 1 wherein said control module determines a cumulative damage of said torque converter clutch based on at least one previous temperature state of said torque converter clutch and selectively activates at least one of said cylinders based on said cumulative damage.

8. The engine control system of claim 1 wherein said control module waits until said temperature state is greater than a predetermined temperature state threshold before reactivating at least one of said cylinders.

9. The engine control system of claim 1 wherein said control module waits until said temperature state is less than a predetermined temperature state threshold before deactivating at least one of said cylinders.

10. The engine control system of claim 1 wherein said control module increases said slip speed when at least one of said cylinders is deactivated.

11. The engine control system of claim 1 wherein said temperature state is a temperature of said torque converter clutch.

12. The engine control system of claim 1 wherein said temperature state is a thermal energy of said torque converter clutch.

13. A method of controlling a displacement on demand engine having a plurality of cylinders in a vehicle having a torque converter with a torque converter clutch, said method comprising:
    determining a temperature state of said torque converter clutch; and
    selectively activating at least one of said cylinders based on said temperature state.

14. The method of claim 13 further comprising:
    determining a slip speed of said torque converter; and
    determining a torque of said torque converter;
    wherein said temperature state is based on said slip speed and said torque.

15. The method of claim 13 further comprising:
    monitoring cumulative damage to said torque converter; and
    selectively activating at least one of said cylinders based on said cumulative damage.

16. The method of claim 15 wherein said monitoring cumulative damage to said torque converter comprises:
    monitoring a temperature state of said torque converter clutch; and
    monitoring a number of revolutions of said torque converter clutch while said temperature state is above a predetermined damage temperature state.

17. The method of claim 13 further comprising waiting until said temperature state is greater than a predetermined temperature state threshold before reactivating at least one of said cylinders.

18. The method of claim 13 further comprising waiting until said temperature state is less than a predetermined temperature state threshold before deactivating at least one of said cylinders.

19. An engine control system for controlling a displacement on demand engine having a plurality of cylinders, comprising:
    a torque converter with a torque converter clutch;
    a sump for retaining a supply of fluid for said torque converter;
    a sump temperature sensor that generates a sump temperature signal based on a temperature of said sump;
    an engine rotational speed sensor that generates an engine rotational speed signal;
    a transmission input shaft speed sensor that generates a transmission input shaft speed signal;
    a solenoid that regulates a flow of fluid to said torque converter clutch; and
    a control module that monitors a slip speed of said torque converter clutch based on said engine rotational speed signal and said transmission input shaft speed signal, regulates a slip speed of said torque converter clutch by controlling a duty cycle of said solenoid, and estimates a temperature of said torque converter clutch based on said slip speed, said duty cycle, a predetermined thermal inertia of said torque converter clutch, and a predetermined heat rejection rate of said torque converter clutch;
    wherein said control module waits until said temperature state is greater than a predetermined temperature state threshold before reactivating at least one of said cylinders and waits until said temperature state is less than a predetermined temperature state threshold before deactivating at least one of said cylinders.

20. The engine control system of claim 19 wherein said control module monitors cumulative damage to said torque converter clutch and reactivates at least one of said cylinders when said cumulative damage data is greater than a cumulative damage threshold.

* * * * *